Aug. 16, 1927.
W. L. MILLER
1,638,868
APPARATUS FOR FORMING TUNGSTEN FILAMENTS
Filed July 14, 1923
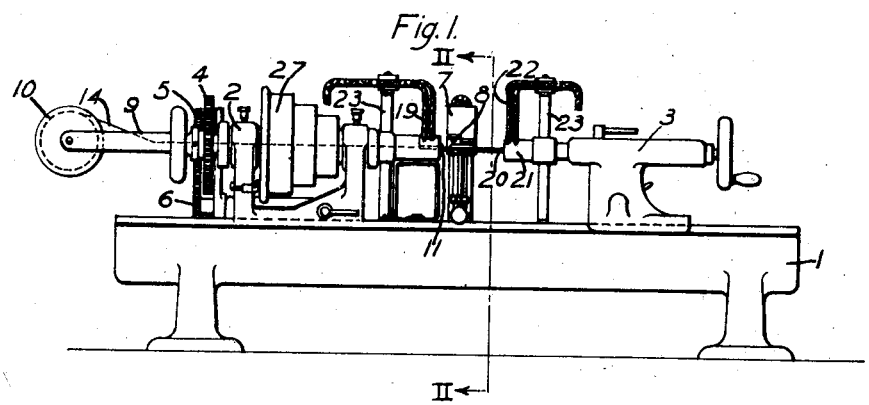
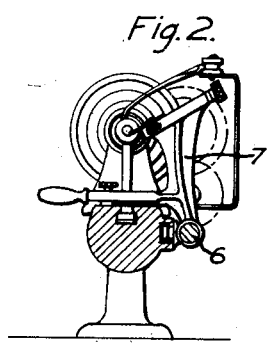
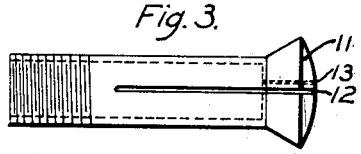
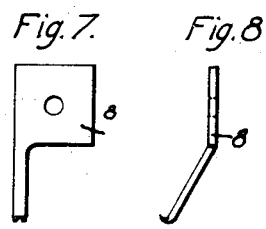
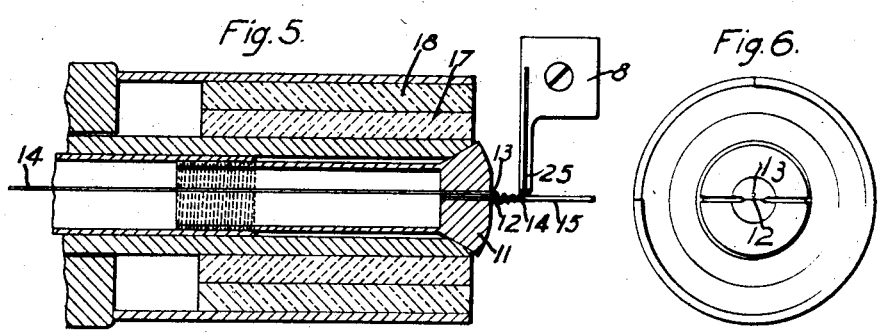
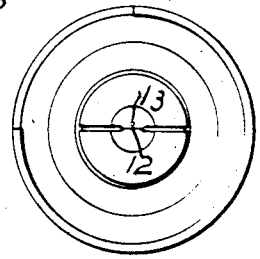
WITNESSES:
*T. H. English*
*W. B. Jaspert*
INVENTOR
*William L. Miller.*
BY
*Wesley G. Carr*
ATTORNEY Patented Aug. 16, 1927.

1,638,868

UNITED STATES PATENT OFFICE.

WILLIAM L. MILLER, OF PITTSBURGH, PENNSYLVANIA, ASSIGNOR TO WESTINGHOUSE ELECTRIC & MANUFACTURING COMPANY, A CORPORATION OF PENNSYLVANIA.

APPARATUS FOR FORMING TUNGSTEN FILAMENTS.

Application filed July 14, 1923. Serial No. 651,590.

My invention relates to a method of and apparatus for forming tungsten filaments, such as are employed in evacuated tubes utilized as current rectifiers and the like.

It is among the objects of my invention to provide a device which shall be efficient for the manufacture of filaments of tungsten or other materials in relatively large quantities and of uniform structure, and which shall be conducive to materially reduce the expense of producing such filaments.

It is a further object of my invention to provide an apparatus which shall be especially adapted to the forming of electrical filaments of simple, compact, structure and which shall be designed to perform the several operations of heating and winding the elongated bodies of tungsten or other materials into the particular shape of filament desired.

The devices heretofore employed for making filaments of tungsten have been complex and expensive, resulting in excessive waste due to the brittle character of the materials employed and the tendency of such materials to split when being formed into helixes and other shapes. My method and apparatus for forming filaments of tungsten obviates these difficulties as I have provided means for heating the mandrel on which the filament is formed and also heating the tungsten body as it is being formed into the shape of a helix, thus preventing the splitting and rupturing of the material.

In the accompanying drawing, constituting a part hereof and in which like reference characters designate like parts, Fig. 1 is a side elevational view of an apparatus embodying the principles of my invention, Fig. 2 is a sectional view thereof taken along the line 2—2 of Fig. 1, Fig. 3 is a side view of a spring collet utilized in the head stock of the machine shown in Fig. 1, for the purpose of holding and feeding the material, Fig. 4 is an end view thereof, Fig. 5 is a longitudinal sectional view of the spring collet disposed in a muffle furnace, Fig. 6 is an end view thereof, Fig. 7 is a front view of the guide member utilized in the feeding of the material, Fig. 8 is a side view of said feeding member, and Fig. 9 is a plan view of a filament made in accordance with my invention.

Referring to Fig. 1, my device consists of a speed lathe or bench lathe, such as is commonly employed for the making of small tools such as dies, taps, and the like and which comprises the usual base 1 having a head-stock and a tail-stock 2 and 3 respectively mounted thereon, the former being connected by suitable trains of gears 4 and 5 to a feed screw shaft 6 which is associated with a movable head 7 to which a wire guide 8, Figs. 7 and 8, is secured. The head-stock is provided with an extension spindle 9 having a wire supply reel 10 rotatably mounted on the end thereof. A spring collet 11 having a central opening 12 and an eccentric opening 13 is secured in the head-stock 2.

The material 14, such as tungsten wire, is fed from the supply reel 10 through the spindle of the head-stock and is passed through the eccentric opening 13 of the spring collet 11. A mandrel 15 is secured in the central opening 12 of the collet 11 to provide a support upon which the wire 14 is wound. A muffle furnace comprising a suitable heating element 17 covered with insulating material 18 is disposed around the collet 11. The element 17 is provided with suitable terminal leads 19 that are adapted to be connected to a source of electrical energy. The tail-stock 3 is provided with a wire guide 20 disposed within the muffle furnace 21 which is connected by leads 22 to a suitable source of electrical energy. The leads 19 and 22 are supported on the bed of the machine by vertical brackets 23.

The operation of the device is briefly as follows: The muffle furnaces 17 and 21 of the collect 11 and the wire guide 20 are heated and the wire 14, usually of tungsten, is passed through the opening 13 to a suitable length which is bent at right angles to the mandrel 15 and disposed within the slot 25 of the wire guide 8. The head-stock spindle is then actuated by a prime mover, such as a belt connected to the pulleys 27 which actuates the feed screw 6 through the gear trains 4 and 5, and causes the guide 8 to be fed horizontally at a speed proportional to the rotation of the head-stock spindle, thus forming a helix of the desired pitch, as illustrated in Fig. 5. When a suitable number of turns have been wound on the mandrel 15, the filament is removed from mandrel 15 sufficiently to permit cutting it off in the form shown in Fig. 9, to produce a filament 28. The operation is then repeated.

The filament 28, when taken from the machine, has one end disposed in a plane parallel with the axis of the helix and its other end at right angles thereto, the latter end being subsequently straightened by heating the wire and bending it.

By utilizing the proper ratio in the gear trains 4 and 5, any desired pitch may be produced in the helix 28 and the number of revolutions may be determined by marking the head-stock spindle or by means of a revolution counter, such as is commonly employed in winding coils or other wire members.

I have found that the heating of the wire 14 through the spring collet and the heating of the mandrel 15 is essential to prevent breakage and splitting and therefore, I consider the heating elements utilized in conjunction with this apparatus as essential to my process.

It is evident from the foregoing description of my invention that the method of forming wire filaments and the like in accordance with the principles of my invention provides a simple and relatively inexpensive manufacturing process.

Although I have described a specific embodiment of my invention, it will be obvious to those skilled in the art that various modifications may be made in the details of construction without departing from the principles herein set forth. For instance, any kind of spindle may be utilized in place of the lathe illustrated in the drawing. A lead screw is not essential as the filaments may be formed by feeding the wire on a mandred in any suitable manner. Any suitable chuck or clamp may be utilized in place of the spring collet.

I claim as my invention:—

1. A device for forming wire filaments comprising a head-stock and a tail-stock mounted upon a suitable support, a spring collet having a central opening adapted to receive a mandrel and an eccentric opening to receive a wire to be wound, said collet being secured in said head-stock, a support for said mandrel secured to said tail-stock and means for heating said mandrel and wire.

2. A device for forming wire filaments comprising a head-stock and a tail-stock mounted upon a suitable support, a spring collet having a central opening adapted to receive a mandrel and an eccentric opening to receive a wire to be wound, said collet being secured in said head-stock, a support for said mandrel secured to said tail-stock and means for heating said collet and mandrel support.

3. A device for forming wire filaments comprising a head-stock and a tail-stock mounted upon a suitable support, a spring collet having a central opening adapted to receive a mandrel and an eccentric opening to receive a wire to be wound, said collet being secured in said head-stock, a support for said mandrel secured to said tail-stock and muffle furnaces disposed around said collet and mandrel support.

4. A device for forming wire filaments comprising a head-stock and a tail-stock mounted upon a suitable support, a feed screw geared to the spindle of the head-stock, a wire guide associated with said screw, a chuck adapted to secure a mandrel, means for heating said chuck, a hollow support for said mandrel secured to said tail-stock and means for heating said mandrel support.

In testimony whereof, I have hereunto subscribed my name this 7th day of July, 1923.

WILLIAM L. MILLER.